Fig. I.

INVENTOR
ROELF JAN MEIJER

United States Patent Office 2,982,088
Patented May 2, 1961

2,982,088

GAS LEAKAGE PREVENTION MEANS FOR HOT GAS RECIPROCATING APPARATUS

Roelf Jan Meijer, Eindhoven, Netherlands, assignor to North American Philips Company, Inc., New York, N.Y., a corporation of Delaware Filed Oct. 3, 1957, Ser. No. 687,990

Claims priority, application Netherlands Oct. 9, 1956

3 Claims. (Cl. 60—24)

This invention relates to thermo dynamic reciprocating apparatus comprising a space which is filled with a readily combustible gas for example hydrogen, a crank case separated from this space by means of a wall containing air and this wall being provided with a bore in which a rod is adapted to reciprocate. The term "thermo-dynamic reciprocating apparatus" is to be understood to include hot-gas engines, refrigerators and heat pumps, the last-mentioned two types of apparatus operating according to the reversed hot-gas engine principle. As a working medium in such apparatus it is known to use a diversity of gases, for example air, nitrogen, helium or readily combustible gases, for example hydrogen.

When using a readily combustible gas and in the case of air being present in the crank-case leakage of this combustible gas to the crank-case may give rise to the formation of an undue gas mixture in the crank-case. The space containing the gas may be the work space of the apparatus. As an alternative, the space containing combustible gas may be an auxilary space for reducing the connecting rod forces in such apparatus.

According to the invention, these harmful gas escapes are prevented by providing the wall, between its bore and the rod with a ringshaped space which is separated by sealing means from the space containing the combustible gas and from the crank-case and which is connected with a conduit opening out to the outside.

It is to be noted that this wall may be either a stationary or a reciprocating wall. The latter may, for example, be the case if a displacer rod passes through a piston or a piston rod.

The ring-shaped space may be constituted by the gap between the rod and the bore of the wall. Alternatively, an additional chamber may be provided in the wall.

It is desirable for the resistance offered to the flow of gas by the sealing means separating the ring-shaped space from the crank case to exceed the resistance offered by the conduit passing to the outside.

The conduit passing to the outside may communicate with the open air or, for example if the thermo dynamic reciprocating apparatus is an engine, with the chimney for the flue gases.

Figure 1:
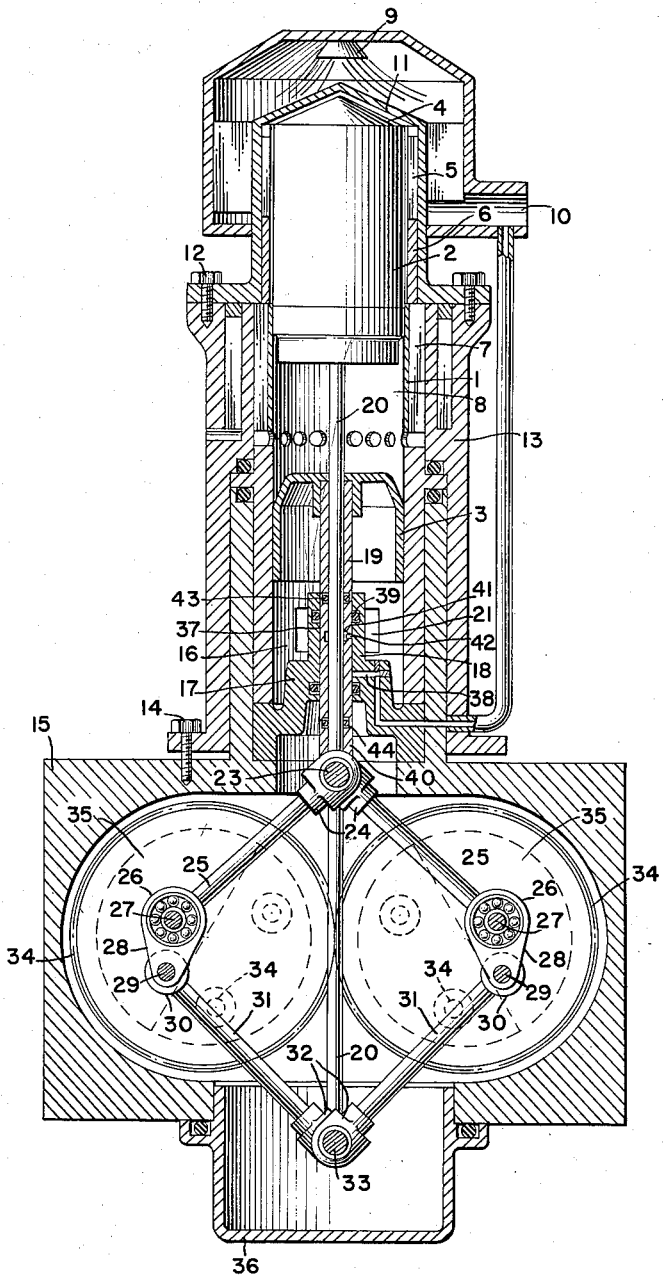
Figure 2:
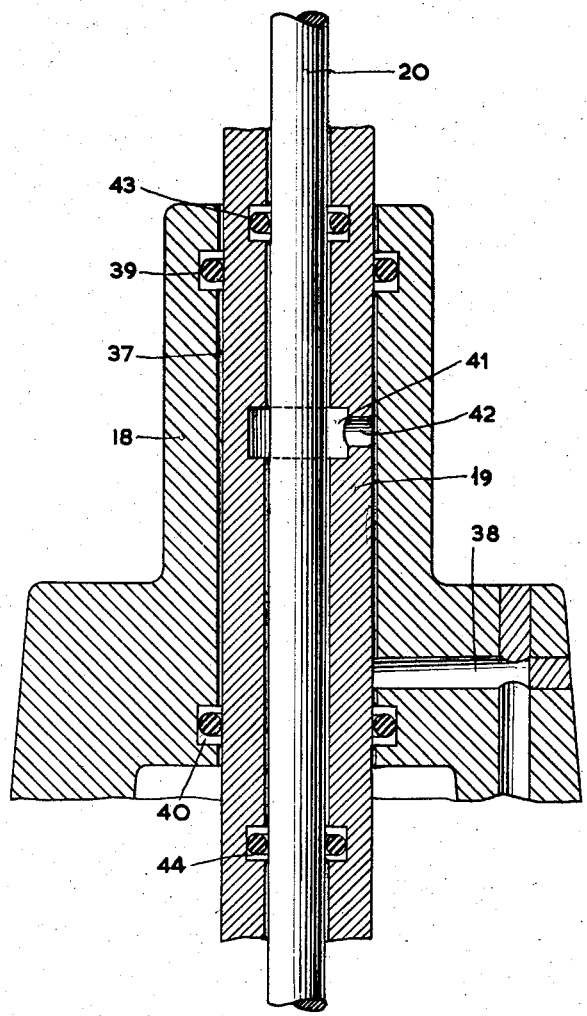

In order that the invention may be readily carried into effect, an example will now be described in detail with reference to the accompanying drawings in which Fig. 1 shows a thermo-dynamic reciprocating apparatus comprising the exhaust conduit according to the invention, and Fig. 2 shows on a larger scale the sealing means of the reciprocating rod.

The apparatus comprises a cylinder in which a displacer 2 and a piston 3 are adapted to reciprocate.

The displacer 2 varies the volumetric capacity of a space 4 which communicates through a heater 5, a regenerator 6 and a cooler 7 with a space 8 between the displacer 2 and the piston 3.

Inside the apparatus, a gas of invariable chemical composition performs a thermo-dynamic cycle during which the gas remains in the same phase.

Thermal energy is supplied to the heater 5 from a schematically represented burner 9, the flue gases leaving the system through a conduit 10. A head 11 of the motor contains the heater 5 and is secured by means of bolts 12 to a jacket 13 containing the cooler 7. The jacket 13 is secured by means of bolts 14 to a crank case 15 of the apparatus. Below the piston 3 provision is made of a space 16 which is separated by means of a wall 17 from the crank-case. The wall 17 comprises a bushing 18 through which a hollow piston rod 19 of the piston is passed, while a displacer rod 20 of the displacer is adapted to reciprocate in the hollow piston rod. The space 16 communicates through channels 21 with spaces 22 (not shown).

Two heads 24 of two connecting rods 25 are rotatable about a shaft 23 which is fixedly secured to the piston rod 19 the displacer rod 20 rigidly secured to the displacer being passed through the shaft 23. The connecting rods 25 further comprises two heads 26 which are rotatable about crank pins 27. Ball-bearings are provided between the heads 26 and the crank pins 27. The heads 26 comprise projecting parts 28 with pins 29 about which two displacer connecting rod heads 30 are rotatable. On the other side of the displacer connecting rods 31, provision is made of heads 32 which are both rotatable about a shaft 33 which is rigidly secured to the displacer rod 20.

The crank pins 29 are eccentrically mounted on shafts (not shown) which are coupled together through gear wheels 34 and carry balance weights 35 secured thereto by means of screws. The crank case 15 comprises a cover 36 at its lower end.

The masses of the piston connecting rods 25, the piston rod 19 and the piston 3 substantially correspond to those of the displacer connecting rods 31, the displacer rod 20 and the displacer 2, while the length of each piston connecting rod 25 substantially corresponds to that of the displacer connecting rod 31.

The process of compression and expansion during one revolution of crankshaft 7 may be described by the following four phases.

*Phase 1.*—The working medium is contained mainly in the cooled compression space 8 where it is compressed by a main piston 3 to the maximum pressure.

*Phase 2.*—The displacer 2 moves the compressed gas from the compression space 8 to the hot expansion space 4 through cooler 7, regenerator 6, and heater 5. The heat of compression is carried off by the cooler 7. The gas is heated by the passage through regenerator 6.

*Phase 3.*—The gas is expanded in hot space 4 and the heat produced is transferred to heater 5. This is accomplished by the simultaneous downward movement of the piston 3 and the displacer 2.

*Phase 4.*—The hot gas is driven back to the compression space 8 by the return motion of the displacer 2 in an upward direction. The working medium gives off heat to the regenerator which was absorbed during the second phase.

In this example, the apparatus according to the invention is, for example, filled with hydrogen gas, the average pressure of which is 100 atmos. during the cycle. For constructional reasons, the pressure inside the crank case should be considerably lower, for example correspond to atmospheric pressure, while it may also be desirable not to fill the crank-case with hydrogen gas. Unless taking special steps, however, the connecting rod forces and the bearing loads of the driving gear then might become very considerable.

However, the space 16 is filled with hydrogen gas at a pressure at least corresponding to the minimum pressure during the cycle, in the present example corresponding, for example, to the average pressure.

As may be seen from Fig. 2, the bushing 18 has a space 37 which communicates through a conduit 38 with the exhaust channel 10 of the burner.

The additional space 16 is sealed by means of an O-ring 39. Further, an O-ring 40 is provided for sealing the crank-case.

The resistance preventing gas from leaking to the crank case exceeds, as a result of the O-ring, the resistance offered by the conduit 38 so as to prevent any hydrogen escaping from the space 16 from flowing to the crank case.

The piston rod 19 is provided with a ring-shaped space 41 which is invariably connected through a channel 42 with the space 37, since the spacing of the O-rings 39 and 40 exceeds the stroke of the displacer. Moreover, the rod is provided with two O-rings 43 and 44 which, similarly to the O-rings 39 and 40, are provided for sealing purposes. Any hydrogen escaping through the gap between the piston rod 19 and the displacer rod 20 is carried off through the channel 42 and the conduit 38.

What is claimed is:

1. A hot gas reciprocating apparatus having a cylinder and comprising a relatively hot chamber and a relatively cold chamber in said cylinder in which a closed thermodynamic cycle is performed by a gaseous medium, a displacer provided with a rod in said cylinder, piston means including a hollow piston rod in said cylinder for continuously varying the volume of said gaseous medium in said chambers, a crankcase for said apparatus, an auxiliary chamber adjacent to said crankcase, a wall separating said auxiliary chamber from said crankcase and having a bore therein, said piston rod adapted for reciprocation in said bore, said displacer rod being operable in the hollow rod of said piston, a first pair of spaced sealing means between said hollow piston rod and the wall of said bore, passage means located between said sealing means and opening to the atmosphere, a second pair of axially spaced sealing means positioned between the displacer rod and the piston rod, an annular space located in the piston rod and between said second sealing means and surrounding a portion of said displacer rod, and a conduit connecting said annular space with the bore of said wall, said sealing means acting to prevent leakage of said gaseous medium from said auxiliary chamber into said crankcase.

2. A hot gas reciprocating apparatus as claimed in claim 1 wherein the resistance offered to said gaseous medium by the sealing means is greater than the resistance offered by said passage means to the atmosphere of any gaseous medium present between the sealing means.

3. A hot gas reciprocating apparatus having a cylinder and comprising a relatively hot chamber and a relatively cold chamber in said cylinder in which a closed thermodynamic cycle is performed by a gaseous medium, a displacer provided with a rod in said cylinder, piston means including a hollow piston rod in said cylinder for continuously varying the volume of said gaseous medium in said chambers, a crankcase for said apparatus, an auxiliary chamber adjacent to said crankcse, a wall separating said auxiliary chamber from said crankcase and having a bore therein, said piston rod adapted for reciprocation in said bore, said displacer rod being operable in the hollow rod of said piston, a first pair of spaced sealing means between said hollow piston rod and the wall of said bore, passage means located between said sealing means and opening to the atmosphere, a second pair of axially spaced sealing means positioned between the displacer rod and the piston rod, an annular space located in the piston rod and between said second sealing means and surrounding a portion of said displacer rod, and a conduit connecting said annular space with the bore of said wall, said sealing means acting to prevent leakage of said gaseous medium from said auxiliary chamber into said crankcase.

References Cited in the file of this patent

UNITED STATES PATENTS

| | | |
|---|---|---|
| 2,210,088 | Longfield | Aug. 6, 1940 |
| 2,573,567 | Hancock | Oct. 30, 1951 |
| 2,689,754 | Dunton | Sept. 21, 1954 |
| 2,885,855 | Meyer | May 12, 1959 |

FOREIGN PATENTS

| | | |
|---|---|---|
| 197,962 | Great Britain | Sept. 22, 1924 |
| 729,941 | Great Britain | May 11, 1955 |